United States Patent
Kroon et al.

(10) Patent No.: US 11,856,223 B2
(45) Date of Patent: Dec. 26, 2023

(54) APPARATUS AND METHOD OF GENERATING AN IMAGE SIGNAL

(71) Applicant: KONINKLIJKE PHILIPS N.V., Eindhoven (NL)

(72) Inventors: Bart Kroon, Eindhoven (NL); Bartolomeus Wilhelmus Damianus Van Geest, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 288 days.

(21) Appl. No.: 17/434,775

(22) PCT Filed: Feb. 12, 2020

(86) PCT No.: PCT/EP2020/053509
§ 371 (c)(1),
(2) Date: Aug. 30, 2021

(87) PCT Pub. No.: WO2020/177990
PCT Pub. Date: Sep. 10, 2020

(65) Prior Publication Data
US 2022/0167013 A1    May 26, 2022

(30) Foreign Application Priority Data
Mar. 1, 2019 (EP) .................... 19160414

(51) Int. Cl.
*H04N 19/597* (2014.01)
*H04N 19/105* (2014.01)
(Continued)

(52) U.S. Cl.
CPC ......... *H04N 19/597* (2014.11); *H04N 19/105* (2014.11); *H04N 19/146* (2014.11); *H04N 19/172* (2014.11)

(58) Field of Classification Search
CPC .. H04N 19/105; H04N 19/132; H04N 19/146; H04N 19/17; H04N 19/172; H04N 19/597; H04N 21/21805; H04N 21/816
(Continued)

(56) References Cited

U.S. PATENT DOCUMENTS

| | | | | |
|---|---|---|---|---|
| 6,807,231 | B1 * | 10/2004 | Wiegand | H04N 19/61 375/E7.262 |
| 10,567,789 | B2 * | 2/2020 | Chen | H04N 19/56 |
| 11,122,295 | B2 * | 9/2021 | Kroon | H04N 13/161 |

FOREIGN PATENT DOCUMENTS

WO    2014005503 A1    1/2014

OTHER PUBLICATIONS

Maugey Thomas Et. Al., Reference View Slection in DIBR Based Multiview Coding, Apr. 1, 2016, IEEE, pp. 1808-1819.*
(Continued)

*Primary Examiner* — Behrooz M Senfi

(57) ABSTRACT

A method of generating an image signal from a plurality of images of a scene performs iterations that comprise generating (505) predicted images for a candidate set of images from a set of (previously) included images. A set of selected images is selected (509) from the set of candidate images in response to a prediction quality. For each selected image a subset of pixels is determined (511) in response to pixel prediction qualities for the pixels of the image, and a set of partial images corresponding to the selected images is generated (513) by selecting (511) a subset of pixels. The selected image is deleted from the candidate set and the partial image is added to the included set. The approach may provide a low complexity and low resource selection of image data representing a scene.

20 Claims, 5 Drawing Sheets

(51) Int. Cl.
*H04N 19/146* (2014.01)
*H04N 19/172* (2014.01)

(58) Field of Classification Search
USPC .................................................. 375/240.02
See application file for complete search history.

(56) References Cited

OTHER PUBLICATIONS

Maugey et al "Reference View Selection in DIBR-Based Multiview Coding" IEEE Transactions on Image Processing, vol. 25, No. 4, Apr. 1, 2016 p. 1808-1819.
Toni et al "In Network View Synthesis for Interactive Multiview Video Systems" IEEE Transactions on Multimedia vol. 18, No. 5, p. 852-864.
Collet et al "High-Quality Steamable Free-Viewpoint Video" ACM Transactions on Grapics, vol. 34, No. 4, Jul. 27, 2015.
International Search Report and Written Opinion From PCT/EP2020/053509 dated Sep. 10, 2020.

\* cited by examiner

APPARATUS AND METHOD OF GENERATING AN IMAGE SIGNAL

CROSS-REFERENCE TO PRIOR APPLICATIONS

This application is the U.S. National Phase application under 35 U.S.C. § 371 of International Application No. PCT/EP2020/053509, filed on Feb. 12, 2020, which claims the benefit of EP Patent Application No. EP 19160414.9, filed on Mar. 1, 2019. These applications are hereby incorporated by reference herein.

FIELD OF THE INVENTION

The invention relates to an apparatus and method for generating an image signal and in particular, but not exclusively, to generation and/or processing of an image signal comprising multiple images for the same scene.

BACKGROUND OF THE INVENTION

The variety and range of image and video applications have increased substantially in recent years with new services and ways of utilizing and consuming video being continuously developed and introduced.

For example, one service being increasingly popular is the provision of image sequences in such a way that the viewer is able to actively and dynamically interact with the system to change parameters of the rendering. A very appealing feature in many applications is the ability to change the effective viewing position and viewing direction of the viewer, such as for example allowing the viewer to move and "look around" in the scene being presented.

Such a feature can specifically allow a virtual reality experience to be provided to a user. This may allow the user to e.g. (relatively) freely move about in a virtual environment and dynamically change his position and where he is looking. Typically, such virtual reality applications are based on a three-dimensional model of the scene with the model being dynamically evaluated to provide the specific requested view. This approach is well known from e.g. game applications, such as in the category of first person shooters, for computers and consoles.

It is also desirable, in particular for virtual reality applications, that the image being presented is a three-dimensional image. Indeed, in order to optimize immersion of the viewer, it is typically preferred for the user to experience the presented scene as a three-dimensional scene. Indeed, a virtual reality experience should preferably allow a user to select his/her own position, camera viewpoint, and moment in time relative to a virtual world.

A large number of virtual reality applications are inherently limited in that they are based on the presence of a predetermined model of the scene, and typically on an artificial model of a virtual world, such as for example for gaming applications.

However, it is desirable to be able to provide virtual reality experiences that allow the user to experience a real world capture. Such applications include e.g. applications that allow a user to freely change position and view direction in a representation of a real world scene. However, the requirements in order to support such freedom are difficult to meet in many circumstances, such as in particular where the real world scene is also a dynamically changing, and specifically a real time scene. For example, providing sufficient data to allow a user to freely move and change view direction for a scene which corresponds to a live, real time broadcast of e.g. a sports event, is typically not practical or feasible. Accordingly, applications and experiences where the user has restricted freedom in movement and/or view directions are receiving increasing interest. For example, a sports event may be broadcast where a user may rotate his head freely within a 180° range but only move his head by a relatively small amount. Such limited movement may reduce the requirements for the data that needs to be provided substantially.

MAUGEY THOMAS ET AL have published in: "*Reference View Selection in DI BR-Based Multiview Coding*", IEEE TRANSACTIONS ON IMAGE PROCESSING, IEEE SERVICE CENTER, PISCATAWAY, NJ, US, vol. 25, no. 4, 1 Apr. 2016 (2016-04-01), pages 1808-1819, XP011602607", an algorithm for the optimal selection of reference views in multiview coding systems. It is described that augmented reality, interactive navigation in 3D scenes, multiview video, and other emerging multimedia applications require large sets of images, hence larger data volumes and increased resources compared with traditional video services. The significant increase in the number of images in multiview systems leads to new challenging problems in data representation and data transmission to provide high quality of experience on resource constrained environments. In order to reduce the size of the data, different multiview video compression strategies have been proposed recently. Most of them use the concept of reference or key views that are used to estimate other images when there is high correlation in the data set. Based on a metric that measures the similarity between the views, an optimization for the positioning of the reference views is carried out such that both the distortion of the view reconstruction and the coding rate cost are minimized.

A critical issue for most applications allowing local rendering of images for different viewpoints of a scene is that of how to represent such a scene, and in particular how to effectively generate, distribute, and process data representing a real world scene such that an end user device is provided with sufficient data to locally generate view images of the real world, and often real time, scene. It is typically not feasible or practical to generate a model of a real world scene and in particular not when the service is supporting a dynamically changing scene such as a real time event.

In many systems, the scene may be represented by images that have been captured by suitable capture apparatuses, such as cameras. For example, cameras may be arranged in a given configuration, such as in a row, with each camera capturing the scene from a given capture pose. The images from different positions may provide a representation of different parts of the scene. For example, a background object may be occluded by a foreground object from some capture positions but not from other capture positions, and thus information related to the background object may be present in some capture images but not in others.

In many practical systems, captured images may be supplemented by depth information, such as a z-value or a disparity value being provided for each pixel in an associated depth map. Such an image+depth representation may be considered a 3D image. Using image+depth information provided for a range of view points may have many applications and for many scenes provide an advantageous representation of the scene allowing local generation of view images. The image+depth information may be transmitted to a rendering device that may dynamically generate view images for the current view position and view direction of a user.

However, whereas an image representation of a scene comprising a plurality of images from different capture positions may provide desirable performance and operation in many embodiments, it tends to also require high data rates for the communication of the image representation to the rendering device. Indeed, directly distributing all captured view images is often infeasible because the pixel rate, and thus the data rate, is much too high. Directly transmitting all images is also wasteful as it includes transmitting a large amount of redundant data. For example, the front of a foreground object may be visible from a plurality of capture positions, and thus visual information for the object will be included in a plurality of the capture images to be transmitted.

However, the issue of how to reduce the required data rate is a complex issue that is difficult to address. It has been proposed to identify and omit some redundant data and then generate an image signal without this redundant data. However, whereas this may reduce the data rate, it is a difficult challenge how to specifically achieve this such that image quality, data rate, complexity, resource requirements etc. are optimized as far as possible.

Hence, an improved approach would be advantageous. In particular, an approach for generating and/or processing an image signal representing a scene by images from different views that allows improved operation, increased flexibility, an improved virtual reality experience, reduced data rates, increased efficiency, facilitated distribution, reduced complexity, facilitated implementation, increased image quality, and/or improved performance and/or operation would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention, there is provided a method of generating an image signal, the method comprising: receiving a candidate set of images comprising a plurality of images of a scene, at least some images of the candidate set of images being for different view poses of the scene; selecting at least one image of the candidate set of images and initializing a set of included images to include the at least one image; iteratively performing the steps of: generating predicted images for the images of the candidate set of images from the images of the set of included images; determining a prediction quality measure for each image of the set of candidate images, the prediction quality measure for a first image of the set of candidate images being indicative of a difference between the first image and a first predicted image for the first image; selecting a set of selected images from the set of candidate images in response to the prediction qualities; for each image of the set of selected images determining a subset of pixels in response to pixel prediction qualities for the pixels of the image; generating a set of partial images corresponding to the set of selected images, the partial image for a given image of the selected set of images comprising only the pixels of the subset of pixels for the given image; including the set of partial images in the set of included images; and removing the set of selected images from the candidate set of images; generating the image signal comprising image data of the images in the set of included images.

The invention may provide an improved representation of a scene. In many embodiments, a more efficient representation of a scene can be provided, e.g. allowing a given quality to be achieved by a reduced data rate.

The approach may in many embodiments provide an improved image signal with a representation of a scene suitable for a flexible, efficient, and high performance local generation of view images for different view positions/poses. In many embodiments, it may allow an improved perceived image quality and/or a reduced data rate.

The approach may allow a particularly efficient and/or low complexity generation of an image signal in many embodiments and scenarios.

The images may be 3D images comprising depth information, such as specifically a 2D image or texture map with associated depth image/map. Selecting the set of selected images from the set of candidate images in response to the prediction qualities may include selecting images of the set of candidate images having a lowest prediction quality measure to be included in the set of selected images.

According to an optional feature of the invention, determining the predication quality for the first image comprises: determining a plurality of pixels of the first image for which pixel values for corresponding pixels of the first image and the first predicted image meet a similarity criterion; determining the prediction quality for the first image in response to a property of the plurality of pixels.

This may provide a particularly advantageous approach in many embodiments.

According to an optional feature of the invention, the property is a number of pixels and the prediction quality is a monotonically increasing function of the number of pixels in the plurality of pixels.

According to an optional feature of the invention, determining the subset of pixels comprises determining a subset of pixels for the first image from pixels of the first image not included in the plurality of pixels for the image.

According to an optional feature of the invention, determining the subset of pixels for a first selected image of the set of selected images comprises: for at least one candidate image of the candidate set of images excluding the set of selected images: determining, for pixels of the at least one candidate image, an error change indicative of a change in difference between a pixel of the at least one candidate image and a predicted pixel for a prediction of the pixel based on the set of included images and the first selected image relative to a prediction of the pixel based only on the set of included images; and generating an error change image for the first selected image, the error change image comprising pixel values determined from error changes of the at least one candidate image by a view pose shift from a view pose of the at least one candidate image to a view pose of the first selected image; and selecting the subset of pixels in response to the error change image.

This may provide a particularly advantageous approach in many embodiments. It may in particular provide an efficient approach for selecting pixels for the partial images based on how well the inclusion of a pixel may improve prediction of other images.

Selecting the subset of pixels in response to the error change image may for example be by selecting pixels for which the error change value is indicative of an improvement above a threshold.

According to an optional feature of the invention, determining the subset of pixels for the first selected image comprises determining error changes for a plurality of candidate images of the set of candidate images, and generating the error change image by combining error change values determined from different candidate images for the same pixel of the first selected image.

This may provide improved performance by efficiently considering how predictions of a plurality of candidate images may be improved by including a specific pixel.

According to an optional feature of the invention, generating predicted images for the candidate set of images comprises for a first candidate image of the set of candidate images: providing intermediate prediction images of the first candidate image for each of the image of the set of included images; and generating the first predicted image by combining the intermediate prediction images.

This may in many embodiments allow a more efficient prediction operation.

According to an optional feature of the invention, the iteration further comprises: storing intermediate prediction images; and wherein providing intermediate prediction images comprises retrieving stored intermediate prediction images for images of the set of included images for which intermediate prediction images have been generated and stored in a previous iteration; and predicting intermediate prediction images for any image of the set of reference images for which no intermediate prediction image has been stored in a previous iteration.

This may provide a highly efficient operation in many embodiments. The approach may allow incremental prediction thereby substantially decreasing the amount of prediction operations necessary.

According to an optional feature of the invention, the combination is a weighted combination and a weight for a pixel is dependent on a depth of the pixel.

According to an optional feature of the invention, the iterations are stopped when a lowest prediction quality exceeds a threshold.

In other embodiments, the iterations may e.g. be stopped when the set of candidate images is empty.

According to an optional feature of the invention, the subset of selected images comprises a plurality of selected images in at least one iteration.

According to an optional feature of the invention, the images are frames of a video sequence, and the method includes using an arrangement of the set of included images for a plurality of frames.

This may provide improved temporal consistency in many embodiments.

According to an optional feature of the invention, the method further comprises generating a mask corresponding to the subset of pixels and modifying subset of pixels in response to an application of a spatial filter to the mask.

According to another aspect of the invention, there is provided an apparatus for generating an image signal, the apparatus comprising: a receiver for receiving a candidate set of images comprising a plurality of images of a scene, at least some images of the candidate set of images being for different view poses of the scene; a reference selector for selecting at least one image of the candidate set of images and initializing a set of included images to include the at least one image; an iterator for iteratively performing the steps of: generating predicted images for the images of the candidate set of images from the images of the set of included images; determining a prediction quality measure for each image of the set of candidate images, the prediction quality measure for a first image of the set of candidate images being indicative of a difference between the first image and a first predicted image for the first image; selecting a set of selected images from the candidate set of images in response to the prediction qualities; for each image of the set of selected images determining a subset of pixels in response to pixel prediction qualities for the pixels of the image; generating a set of partial images corresponding to the set of selected images, the partial image for a given image of the selected set of images comprising only the pixels of the subset of pixels for the given image; including the set of partial images in the set of included images; and removing the set of selected images from the candidate set of images; an output circuit for generating the image signal comprising image data of the images in the set of included images.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

Figure 1:
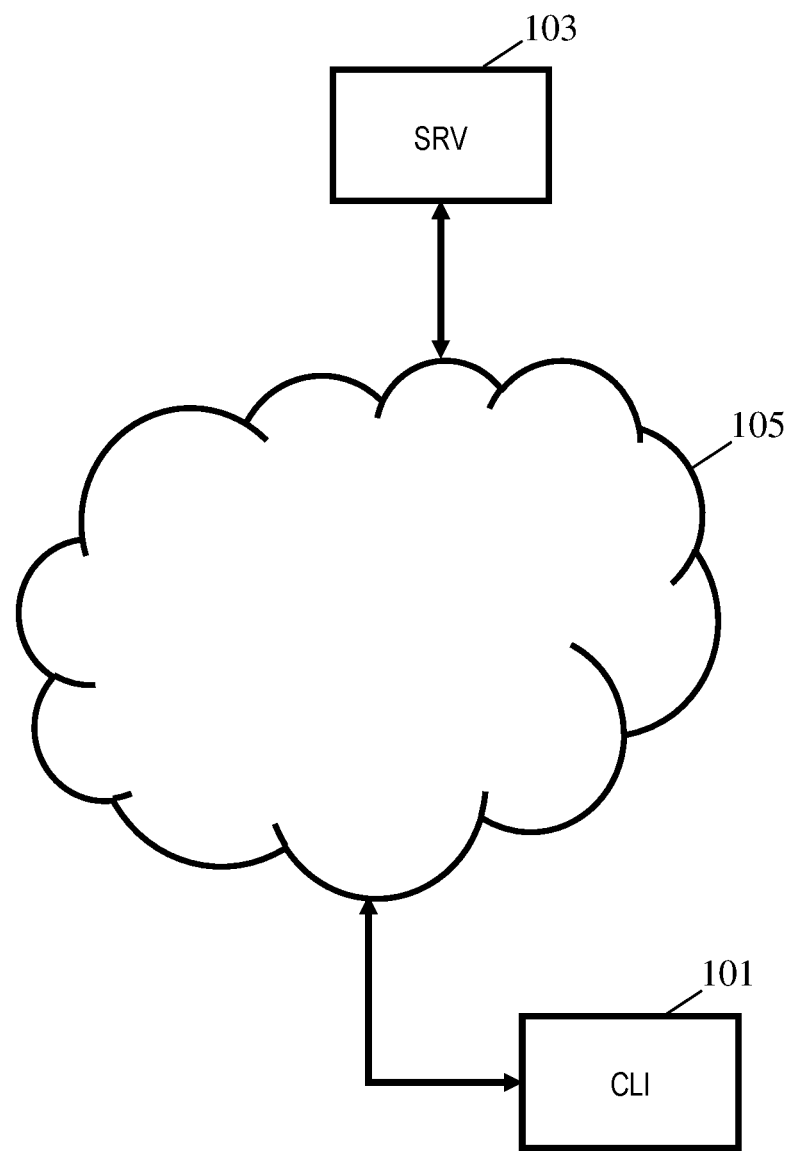
FIG. 1 illustrates an example of an arrangement for providing a virtual reality experience.

Virtual experiences allowing a user to move around in a virtual world are becoming increasingly popular and services are being developed to satisfy such a demand. However, provision of efficient virtual reality services is very challenging, in particular if the experience is to be based on a capture of a real-world environment rather than on a fully virtually generated artificial world.

In many virtual reality applications, a viewer pose input is determined reflecting the pose of a virtual viewer in the scene. The virtual reality apparatus/system/application then generates one or more images corresponding to the views and viewports of the scene for a viewer corresponding to the viewer pose.

Typically, the virtual reality application generates a three-dimensional output in the form of separate view images for the left and the right eyes. These may then be presented to the user by suitable means, such as typically individual left and right eye displays of a VR headset. In other embodiments, the image may e.g. be presented on an autostereoscopic display (in which case a larger number of view images may be generated for the viewer pose), or indeed in some embodiments only a single two-dimensional image may be generated (e.g. using a conventional two-dimensional display).

The viewer pose input may be determined in different ways in different applications. In many embodiments, the physical movement of a user may be tracked directly. For example, a camera surveying a user area may detect and track the user's head (or even eyes). In many embodiments, the user may wear a VR headset which can be tracked by external and/or internal means. For example, the headset may comprise accelerometers and gyroscopes providing information on the movement and rotation of the headset and thus the head. In some examples, the VR headset may transmit signals or comprise (e.g. visual) identifiers that enable an external sensor to determine the movement of the VR headset.

In some systems, the viewer pose may be provided by manual means, e.g. by the user manually controlling a joystick or similar manual input. For example, the user may manually move the virtual viewer around in the scene by controlling a first analog joystick with one hand and manually controlling the direction in which the virtual viewer is looking by manually moving a second analog joystick with the other hand.

In some applications a combination of manual and automated approaches may be used to generate the input viewer pose. For example, a headset may track the orientation of the head and the movement/position of the viewer in the scene may be controlled by the user using a joystick.

The generation of images is based on a suitable representation of the virtual world/environment/scene. In some applications, a full three-dimensional model may be provided for the scene and the views of the scene from a specific viewer pose can be determined by evaluating this model. In other systems, the scene may be represented by image data corresponding to views captured from different capture poses, and specifically may be represented by a plurality of source images with associated depth, where each image represents the scene from a different viewpoint. In such approaches, view images for other poses than the capture pose(s) may be generated by three dimensional image processing, such as specifically using view shifting algorithms. In systems where the scene is described/referenced by view data stored for discrete view points/positions/poses, these may also be referred to as anchor view points/positions/poses. Typically, when a real world environment has been captured by capturing images from different points/positions/poses, these capture points/positions/poses are also the anchor points/positions/poses.

A typical VR application accordingly provides (at least) images corresponding to viewports for the scene for the current viewer pose with the images being dynamically updated to reflect changes in the viewer pose and with the images being generated based on data representing the virtual scene/environment/world.

In the field, the terms placement and pose are used as a common term for position and/or direction/orientation. The combination of the position and direction/orientation of e.g. an object, a camera, a head, or a view may be referred to as a pose or placement. Thus, a placement or pose indication may comprise six values/components/degrees of freedom with each value/component typically describing an individual property of the position/location or the orientation/direction of the corresponding object. Of course, in many situations, a placement or pose may be considered or represented with fewer components, for example if one or more components is considered fixed or irrelevant (e.g. if all objects are considered to be at the same height and have a horizontal orientation, four components may provide a full representation of the pose of an object). In the following, the term pose is used to refer to a position and/or orientation which may be represented by one to six values (corresponding to the maximum possible degrees of freedom).

Many VR applications are based on a pose having the maximum degrees of freedom, i.e. three degrees of freedom of each of the position and the orientation resulting in a total of six degrees of freedom. A pose may thus be represented by a set or vector of six values representing the six degrees of freedom and thus a pose vector may provide a three-dimensional position and/or a three-dimensional direction indication. However, it will be appreciated that in other embodiments, the pose may be represented by fewer values.

A pose may be at least one of an orientation and a position. A pose value may be indicative of at least one of an orientation value and a position value.

A system or entity based on providing the maximum degree of freedom for the viewer is typically referred to as having 6 Degrees of Freedom (6DoF). Many systems and entities provide only an orientation or position and these are typically known as having 3 Degrees of Freedom (3DoF).

In some systems, the VR application may be provided locally to a viewer by e.g. a stand alone device that receives scene data (independent of the specific viewer pose for a local viewer) from a remote device/server and then locally generates view images for the specific current views of the local viewer. Thus, in many applications, especially for broadcast services, a source may transmit scene data in the form of an image (including video) representation of the scene which is independent of the viewer pose. For example, an image representation comprising a plurality of captured view images and associated depth maps may be received. The individual clients may then locally synthesize view images corresponding to the current viewer pose.

A particular application which is attracting particular interest is where a limited amount of movement is supported such that the presented views are updated to follow small movements and rotations corresponding to a substantially static viewer making only small head movements and rotations of the head. For example, a viewer sitting down can turn his head and move it slightly with the presented views/images being adapted to follow these pose changes. Such an approach may provide a highly and immersive e.g. video experience. For example, a viewer watching a sports event may feel that he is present at a particular spot in the arena.

Such limited freedom applications have the advantage of providing an improved experience while not requiring an accurate representation of a scene from many different positions thereby substantially reducing the capture requirements. Similarly, the amount of data that needs to be provided to a renderer can be reduced substantially. Indeed, in many scenarios, only image and typically depth data for a single viewpoint need to be provided with the local renderer being able to generate the desired views from this. In order to support head rotations, it is typically desired that a large area of the view from the viewpoint is represented by the provided data, and preferably the whole surface of a view sphere centered on the view point is covered by the provided image and depth data.

The approach may specifically be highly suitable for applications where the data needs to be communicated from a source to a destination over a bandlimited communication channel, such as for example for a broadcast or client server application.

FIG. 1 illustrates such an example of a VR system in which a remote VR client device 101 liaises with a VR server 103 e.g. via a network 105, such as the Internet. The server 103 may be arranged to simultaneously support a potentially large number of client devices 101.

The VR server 103 may for example support a broadcast experience by transmitting image data and depth for a plurality of viewpoints with the client devices then being arranged to process this information to locally synthesize view images corresponding to the current pose.

In order to provide an efficient distribution, it is desirable for the data rate to be kept as low as possible for a given image quality, and thus may specifically include seeking to reduce the amount of redundant data which is generated.

Figure 2:
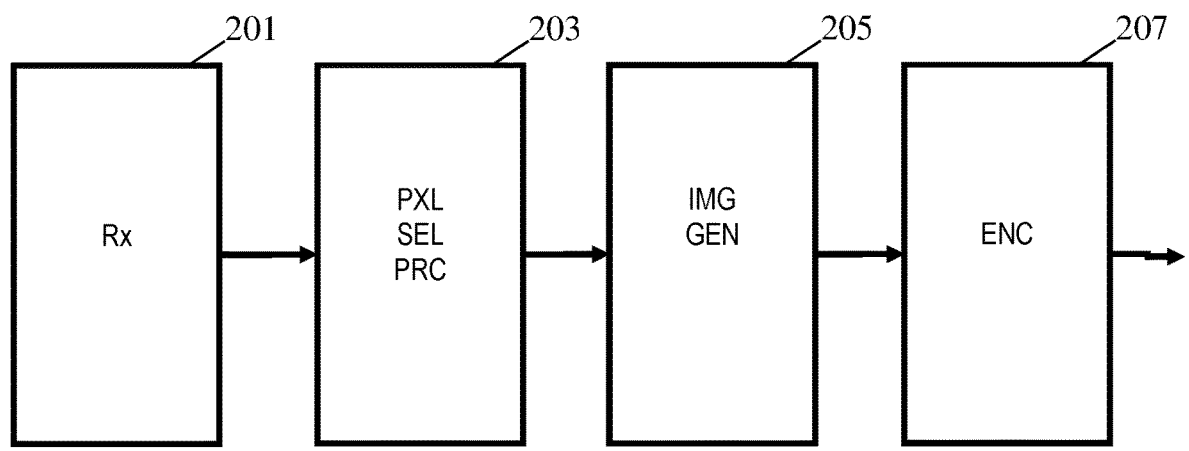
FIG. 2 illustrates an example of elements of an image signal transmitter in accordance with some embodiments of the invention.

FIG. 2 illustrates an example of an apparatus for generating an image signal which includes a representation of a plurality of images of the scene from different view poses (anchor poses). The apparatus will also be referred to as an image signal transmitter 200. The image signal transmitter 200 may for example be comprised in the VR server 103 of FIG. 1.

Figure 3:
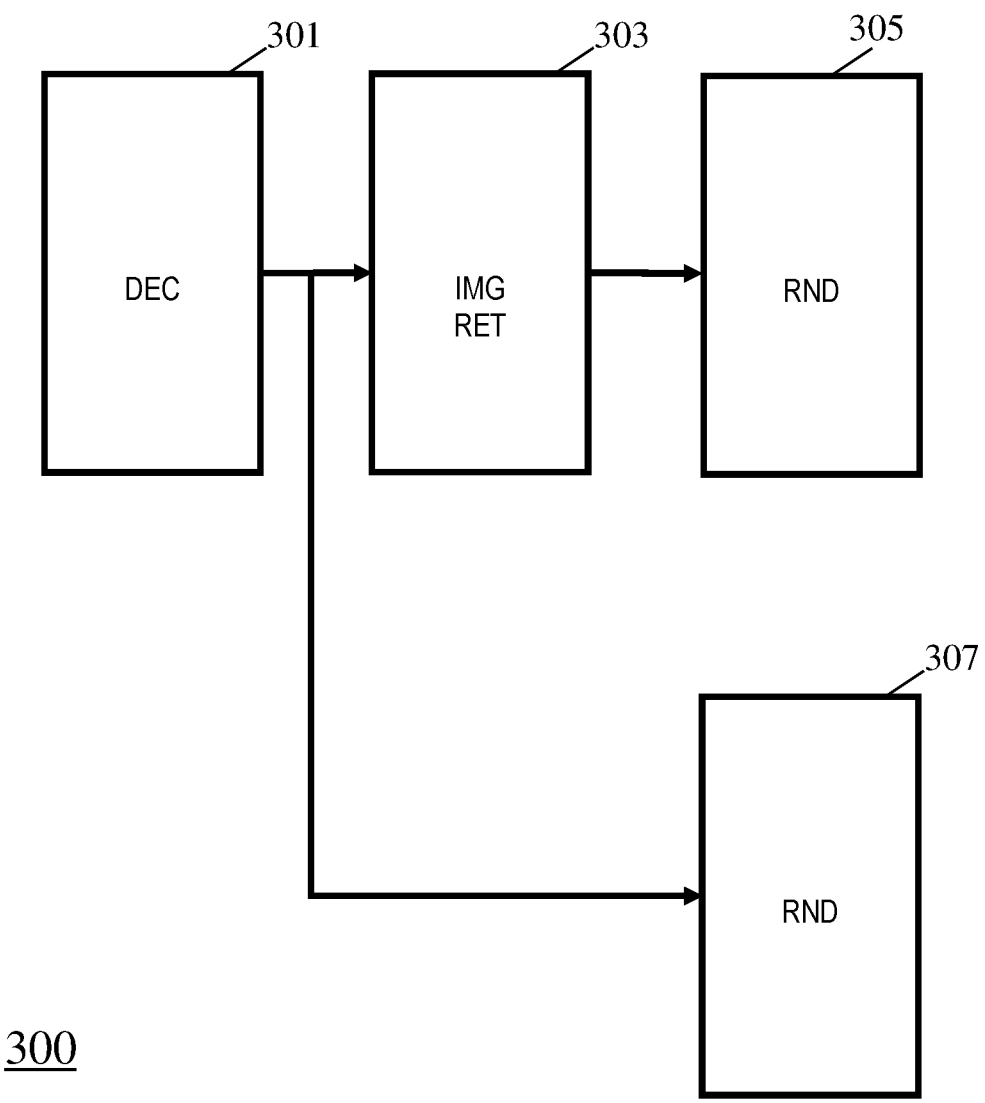
FIG. 3 illustrates an example of elements of an image signal receiver in accordance with some embodiments of the invention.

FIG. 3 illustrates an example of an apparatus for rendering view images based on a received image signal which includes a representation of a plurality of images of the scene. The apparatus may specifically receive the data signal generated by the apparatus of FIG. 2 and proceed to process this in order to render images for specific view poses. The apparatus of FIG. 3 will also be referred to as an image signal receiver 300. The image signal receiver 300 may for example be comprised in the client device 101 of FIG. 1.

The image signal transmitter 200 comprises an image source receiver 201 which is arranged to receive a plurality of source images of the scene. The source images may represent views of the scene from different capture poses. For example, the source images may comprise images from a row of equidistant capture poses.

In many embodiments, the source images may be 3D images comprising 2D images with associated depth information. The 2D images may specifically be view images for viewports of the scene from the corresponding capture pose, and the 2D image may be accompanied by a depth image or map comprising depth values for each of the pixels of the 2D image. The 2D image may be a texture map.

The depth values may for example be disparity values or distance values, e.g. indicated by a z-coordinate. In some embodiments, a source image may be a 3D image in the form of a texture map with an associated 3D mesh. In some embodiments, such texture maps and mesh representations may be converted into image plus depth representations by the image source receiver before further processing by the image signal transmitter 200.

The image source receiver 201 accordingly receives a plurality of source images that characterize and represent the scene from different poses. Such a set of source images will allow view images to be generated for other poses using algorithms such as view shifting as will be known to the skilled person. Accordingly, the image signal transmitter 200 is arranged to generate an image signal that comprises image data for the source images and transmit this data to a remote device for local rendering. However, directly transmitting all the source images will require an unfeasibly high data rate and will comprise a large amount of redundant information.

The image signal transmitter 200 is arranged to reduce the data rate by generating partial images in which redundant information has been removed. The partial images are subsequently combined and encoded to generate the image signal.

The image source receiver 201 is coupled to a pixel selector 203 which is arranged to generate a set of images from the source images where at least one of the set of images is a partial image. The pixel selector 203 may generate the set of partial images by generating partial versions of one or typically most (or even all) of the source images by selecting a subset of the pixels in the source image to include in the image signal. A partial image will also be referred to as a pruned image and the selection of a subset of pixels of an image to generate a partial image thereof will also be referred to as pruning the image.

Thus, the output of the pixel selector 203 may be a set of pruned or partial images corresponding to the source images but with one or typically most of the images being partial versions of the corresponding source image. The pixel selector 203 seeks to select this subset of pixels to include in a partial image such that the overall redundancy of the generated set of partial images is reduced or preferably minimized. The generated partial images may also include one or more original source images that have not been pruned.

The pixel selector 203 is coupled to an image generator 205 which is fed the set of partial images. The image generator 205 is arranged to combine the partial images into combined images where each image may represent one or more of the partial images. Specifically, a combined image may include pixels originating from a plurality of the partial images. For example, pixels from one partial image may be inserted into unused areas of another partial image. The image generator 205 can be seen as packing the partial images into combined images that are more densely packed.

The image generator 205 generates fewer but less sparse images. The set of combined images are fed to an encoder 207 which proceeds to perform the encoding of the images. Since the image generator 205 has reduced the number of images to transmit, a more efficient encoding is typically achieved. Further the packing of the partial images into combined images may typically be performed such that the resulting images are highly suitable for encoding.

A particular advantage of the approach is that the representation of the scene by partial images is achieved in a way that allow conventional image and video encoding approaches to be performed by the encoder 207. For example, in many embodiments encoding formats such as High Efficiency Video Coding (HEVC), also known as H.265 and MPEG-H Part 2, or Versatile Video Coding (VVC) developed by the Joint Video Exploration Team (JVET) may be used.

The image signal transmitter 200 of FIG. 2 may accordingly provide an efficient approach for generating an efficient image signal representing a scene from a range of view poses.

The image signal is transmitted to an image signal receiver 300 which comprises a decoder 301 that is arranged to receive the image signal and to decode this to generate the set of combined images that were fed to the encoder 207. Thus, the decoder 301 may be arranged to perform a decoding according to the standard that was used by the encoder 207, such as for example by performing a HEVC or VVC decoding.

It will be appreciated that the image signal transmitter 200 and the image signal receiver 300 further comprises required functionality for communicating the image signal including functionality for encoding, modulating, transmitting, receiving etc. the image signal. It will be appreciated that such functionality will depend on the preferences and requirements of the individual embodiment and that such techniques will be known to the person skilled in the art and therefore for clarity and brevity will not be discussed further herein.

The decoder 301 is coupled to an image retriever 303 which is arranged to retrieve the partial images from the received combined images. The image retriever 303 may accordingly perform the reverse function of the image generator 205 in order to divide the pixels of a combined image out into individual partial images. Thus, whereas the combined image typically comprises pixels corresponding to a plurality of different viewpoints or poses, the partial images are generated such that each image comprises pixels originating from only one source image and thus corresponding to only one view pose.

In many embodiments the image signal also comprises one or more complete source images and the output of the image retriever 303 accordingly provides set of images corresponding to the source images, and thus representing the scene from a range of view poses, with one or more of the images being only a partial image. However, the missing part from a given partial image typically corresponds to redundant information that is available from other images of the output set of images from the image retriever 303.

The images are fed to a first renderer 305 which is arranged to generate new view images based on the set off partial images (and any full images) received. These images correspond to the original source images. It will be appreciated that any suitable algorithm for rendering a view image corresponding to a given viewer pose may be used. For example, the first renderer 305 may be arranged to first generate a view image based on a received full source image. This may typically result in a number of holes resulting from the occlusion due to the changed viewpoint. Such holes may then be filled in using data from the partial images. It will be appreciated that the skilled person will be aware of many different algorithms and approaches for synthesizing views for specific purposes based on images from other viewpoints and that any suitable algorithm may be implemented by the first renderer 305.

In some embodiments, the image signal receiver 300 may include a second renderer 307 which is arranged to synthesize view images directly from the received combined images. In many embodiments, the image signal receiver 300 will comprise either the first renderer 305 and the image retriever 303, or the second renderer 307. It will be appreciated that the second renderer 307 may use any suitable approach for rendering view images for a given viewer pose.

The first and second renderers may use the same synthesis method and parameters which may be advantageous as it may increase the value of the predictions.

Figure 4:
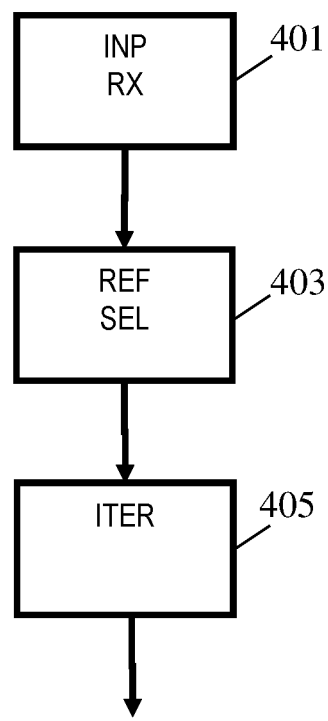
FIG. 4 illustrates an example of elements of an iterator for an image signal transmitter in accordance with some embodiments of the invention.
Figure 5:
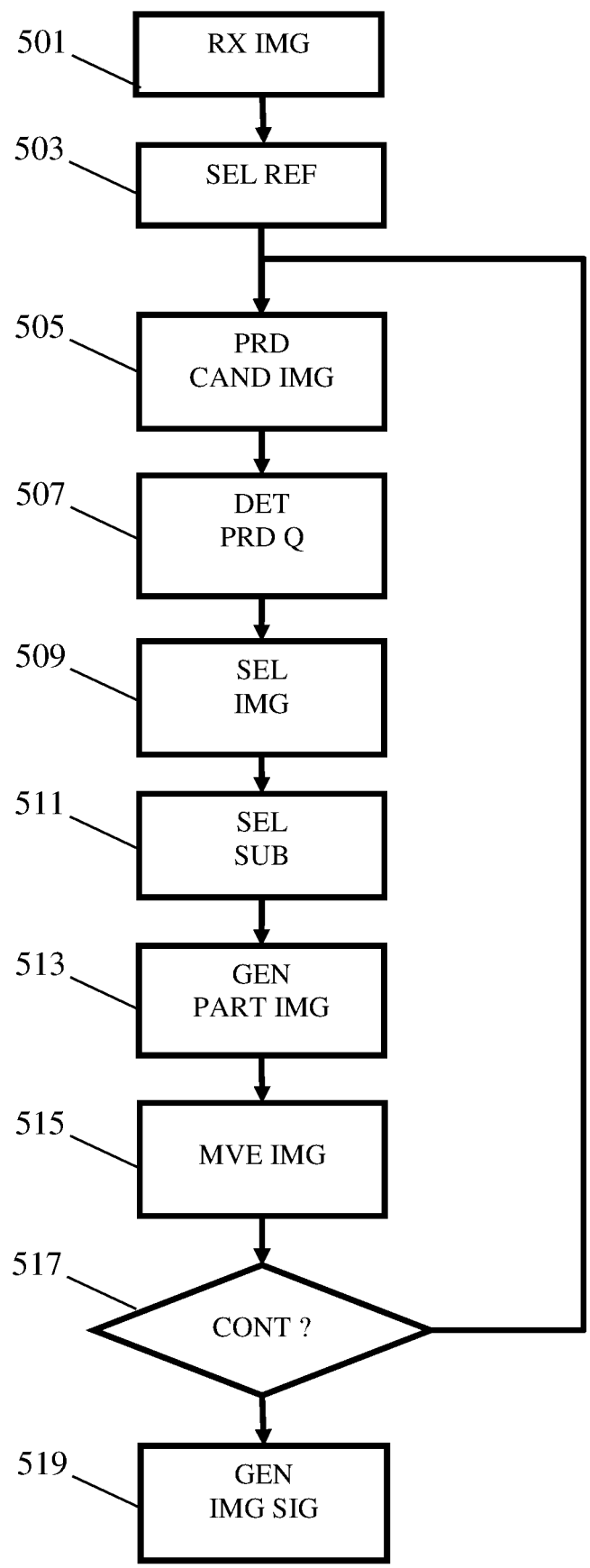
FIG. 5 illustrates an example of a method for generating image data for an image signal in accordance with some embodiments of the invention.

A particularly critical issue of an approach based on partial images, such as the approach of FIGS. 2 and 3, is that of how the partial images are generated and how to select which pixels to include in the partial images. FIG. 4 illustrates an example of elements of a possible implementation of the pixel selector 203 which in many embodiments and scenarios may provide a particularly advantageous and efficient generation of a set of partial images from a set of source images. FIG. 5 illustrates an example of a method of operation of the image signal transmitter 200 with specific emphasis on the operation of the pixel selector 203 of FIG. 4. However, it will be appreciated that the approach of FIGS. 4 and 5 may be applicable to other embodiments than the image signal transmitter 200 and image signal receiver 300 of FIGS. 2 and 3.

The approach of the pixel selector 203 is specifically based on an iterative processing of the input source images. A set of candidate images is generated that comprises images that have not yet been processed (and which is initialized comprising all the source images). The process then iteratively proceeds to select one or more of the candidate images and add them to a set of included images after having been pruned. Thus, iteratively candidate images are selected, pruned, and then moved to the secondary identifier. The approach may provide an efficient way of selecting how to prune the images, and specifically the order in which to do so in order to provide a selected set of pruned or partial images that may provide a more accurate and complete representation of the scene for use in locally generating view images.

As previously mentioned, the image source receiver 201 receives a set of images comprising a plurality of images of the scene and with at least some, and typically all of these, being for different view poses of the scene. The images may specifically be 3D images comprising a 2D image/texture map and associated depth map.

The pixel selector 203 comprises an input receiver 401 which performs step 501 in which it receives the set of source images from the image source receiver 201. Thus, the input receiver 401 receives a set of source images which typically are texture maps and depth maps for a range of view poses. The input receiver 401 initiates the set of candidate images (the set will also for brevity be referred to simply as the candidate set).

The input receiver 401 is coupled to a reference selector 403 which performs step 503 in which a set of included images is initialized by selecting one or more of the candidate images and including it (them) in the set of included images. The set of included images comprises the images (typically partial images) of the candidate images for which image data is included in the image signal generated by the image signal transmitter 200. The set of included images is initialized in step 503 by selecting typically one candidate image as an included image.

The selected image is typically included as a full image and thus all pixels of the selected image(s) are included. The selected image may typically provide more information of the scene than any other included image (as these will typically be partial images) and may be considered to be an initial reference image for the image synthesis by a remote renderer as well as being a reference for the selection of other included images and for determining which pixels of the corresponding candidate image should be selected for the partial image.

It will be appreciated that different approaches and criteria may be used to select the initial reference images for the set of included images. In some embodiments, the reference selector 403 may simply select the candidate image corresponding to the most central image. In other embodiments, the reference image may be selected based on an analysis of the associated depth map. For example, in order to select an image which includes as much of the background as possible, the candidate image having the largest number of pixels with a depth above a given threshold may be selected.

In some embodiments, the reference image(s) may e.g. be based on a viewport similarity for the viewports of the different candidate images. For example, a viewport similarity may be calculated e.g. by sampling a set of pixels from one view (i.e. one source image/capture pose) and projecting those to another view, and then determining the similarity between this synthesized image and the original image. The metric could be made symmetric by repeating the process in the opposite direction.

As an example of a similarity measure, the difference between the synthesized and original pixel values may be determined and this may be averaged across the image/viewport. As another example, the number of pixels for which an error is below a given threshold may be counted and the number of such pixels may be used as a similarity measure.

The process may for a given candidate image be performed for all other candidate images and the similarity measures may be combined into one single similarity measure for the candidate image. The process may further be repeated for all (or some) of the candidate images and finally the candidate image may be selected as the one with the overall highest similarity measure.

Thus, the reference image may be selected as the image which allows the best average prediction/view synthesis of the other candidate images.

The selector 403 is coupled to an iterator 405 which is arranged to iteratively expand the set of included images to include partial versions of the candidate images. In each iteration, a subset, and typically one, of the candidate images are selected for inclusion in the set of included images. For each selected candidate image, a partial image is generated and added to the set of included images and the selected candidate image is removed from the set of candidate images.

In some embodiments, the iterator 405 continues iterating the process until all candidate images have been selected. In other embodiments, the iterative process may potentially stop before all candidate images have been selected.

The iterative process may result in the order in which candidate images are selected varying dependent on the characteristics of the images. As the partial images depend on the previously selected images (and the partial images already included in the set of included images), the different order may result in different partial images. The iterative process seeks to select candidate images in an order that results in partial images being generated which may reduce the data rate, and which specifically may be suitable for efficient image coding by the encoder 207. In many embodiments, the iterative process may seek to reduce the number of pixels comprised in the partial images.

The iteration starts in step 505 wherein the iterator 405 generates predicted images for the images of the set of candidate images from the images of the set of included images. A predicted image for a first candidate image of the set of candidate images from a first included image from the set of included images may be an image for the view pose of the first candidate image generated by view synthesis from the first included image. As the first included image and the first candidate image correspond to source images for different view poses, the view synthesis includes a view pose shift, and typically a view position shift. The view synthesis may be a view shift image synthesis. Thus, the predicted image for a first candidate image from a first included image may be an image that reflects how well the viewport from the view pose of the candidate image can be predicted/estimated from the first included image.

A prediction of a first image from a second image may specifically be a view synthesis of an image at the view pose of the first image based on the second image (and the view pose of this). Thus, a prediction operation to predict a first image from a second image may be a view pose shift of the second image from the view pose associated with this to the view pose of the first image.

It will be appreciated that different methods and algorithms for view synthesis and prediction may be used in different embodiments. In many embodiments, a view synthesis/prediction algorithm may be used which as an input takes a synthesis view pose for which the synthesized image is to be generated, and a plurality of input images each of which is associated with a different view pose. The view synthesis algorithm may then generate the synthesized image for this view pose based on the input images that may typically include both a texture map and depth.

A number of such algorithms are known, and any suitable algorithm may be used without detracting from the Invention. As an example of such an approach, intermediate synthesis/prediction images may first be generated for each input image. This may for example be achieved by first generating a mesh for the input image based on the depth map of the image. The mesh may then be warped/shifted from the view pose of the input image to the synthesis view pose based on geometric calculations. The vertices of the resulting mesh may then be projected onto the intermediate synthesis/prediction image and the texture map may be overlaid this image. Such a process may for example be implemented using vertex processing and fragment shaders known from e.g. standard graphic pipelines.

In this way, an intermediate synthesis/prediction image (henceforth just intermediate prediction image) for the synthesis view pose may be generated for each of the input images.

The intermediate prediction images may then be combined together, e.g. by a weighted combination/summation or by a selection combining. For example, in some embodiments, each pixel of the synthesis/prediction image for the synthesis view pose may be generated by selecting the pixel from the intermediate prediction image which is furthest forward, or the pixel may be generated by a weighted summation of the corresponding pixel value for all the intermediate prediction images where the weight for a given intermediate prediction image depends on the depth determined for that pixel. The combination operation is also known as a blending operation.

In step 505, the iterator 405 may accordingly proceed to generate a predicted image for a first candidate image based on the images in the set of included images, i.e. for each of the already included images. The prediction may thus (apart from typically the first iteration) be based on a plurality of images of which some images are partial images.

A view synthesizer may for example proceed to generate an intermediate image for each included image by view shifting this to the view pose of the first candidate image. It may then generate the predicted image for the first candidate image by blending these intermediate prediction images. As some of the images are partial images comprising image data for only a subset of pixels, the blending/combination for at least some pixels will only comprise pixels from a subset of the intermediate prediction images (i.e. the intermediate prediction images may also be partial images).

Thus, for a first candidate image, a first predicted image is generated based on the included images, i.e. based on the images that are already in the set of included images. This predicted image may accordingly reflect how well the first candidate image can be predicted from the image data that is already selected to be part of the image signal. The process may be repeated for all candidate image and thus a predicted image may be generated for each candidate image, and thus step 505 generates a predicted image for each candidate image based on the included images already selected.

The iterator 405 then proceeds in step 507 in which a predication quality is determined for each of the candidate images where the prediction quality measure for a given candidate image is a measure indicative of the difference between the candidate image and the predicted image for the candidate image.

Thus, the prediction quality measure is a measure for which an increasing value may indicate an improved quality of the prediction of the candidate image from the set of (already) included images. The prediction quality measure may be determined by directly comparing the predicted image and the candidate image. For example, a prediction quality measure may be determined as an average or accumulated error between corresponding (same position) pixel values of the candidate image and the predicted image. As another example, a prediction quality may be determined as the number of pixels for which a difference between the pixel value of the candidate image and the predicted image exceeds a threshold. It will be appreciated that other prediction quality measures may be used in other embodiments.

Thus, at the end of step 507, a prediction quality measure is determined for each candidate image which reflects the quality of the prediction of the candidate image from the images of the set of included images.

Step 507 is followed by step 509 in which the iterator 405 proceeds to select a set of selected images from the set of candidate images in response to the prediction quality. The iterator 405 may specifically select a predetermined number of candidate images as the candidate images having the lowest prediction quality measure, i.e. a predetermined number of candidate images that are most poorly predicted by the already included images is selected.

The iterator 405 then proceeds to determine a pruned or partial image for the selected image(s) which are then moved from the set of candidate images. In many embodiments, only a single candidate image is selected in each iteration and for clarity and brevity the following description will focus on this approach, but it will be appreciated that the references to a single candidate image being selected may be extended to a subset including a plurality of images being selected.

Step 509 is followed by step 511 in which the iterator 405 generates a partial image corresponding to the selected image where the partial image comprises only a subset of pixels of the selected image.

Specifically, the iterator 405 may proceed to select a subset of pixels of the candidate image that was selected. It will be appreciated that different approaches and algorithms may be used to select which pixels to include in the subset and which pixels to exclude. The subset of pixels is selected in response to pixel prediction qualities and specifically a measure or indication of the pixel prediction quality for each pixel may be determined. The pixel prediction quality measure may be indicative of how well the pixel can be predicted, typically from other included images, and/or may be indicative of the improvement in prediction of other images can be achieved by including the pixel in the subset. The iterator 405 may select a pixel to be included or excluded from the subset based on whether the pixel prediction quality measure meets a criterion or not.

In many embodiments, the selection of pixels may be based on a difference between the pixel values of the predicted image and the selected image. For example, pixels may be included in the subset if the difference between the predicted value and the actual value in the candidate image exceeds a threshold and otherwise it may not be included.

As will be described further below, in some embodiments much more complex approaches may be used including assessing how the prediction of other images may be improved by including a pixel in the partial image.

In some embodiments, a first pixel of the candidate image may be selected for the subset in response to a determination that a measure of the difference between the predicted value for the first pixel in the predicted image and the value of the pixel in the candidate image exceeds a threshold.

In some embodiments a prediction improvement measure may be determined for each pixel which is indicative of an improvement in the prediction of (one or more) pixels of other candidate images by the inclusion of the pixel in the prediction. The subset may then be selected in response to the prediction improvement measure, e.g. by selecting pixels for which the prediction improvement measure is above a threshold.

A partial image is thus generated for the candidate image which comprises image data only for a subset of pixels. The partial image may be generated by discarding a complementary subset of pixels in the candidate image. Discarding pixels may be by not including information of the pixel values in the partial image, and e.g. setting the corresponding pixel values to a fixed value (e.g. zero) or a value independent of the pixel value in the candidate image. An approach to discarding pixels is to not include them in the combined images generated by the image generator 205. The generation of the partial image may specifically be considered to correspond to the generation of a pruning mask which may be overlaid the candidate image with the partial image comprising only the pixels that are not masked by the mask.

Step 511 is followed by step 513 in which the partial image (or partial images in case more than one candidate image is selected) is added to the set of included images. Step 513 is followed by step 515 in which the selected image(s) is (are) removed from the set of candidate images.

Thus, the iteration may specifically evaluate the set of included images to find one or more images which are then moved to the set of included images after being pruned to generate a partial image.

Step 515 is followed by step 517 in which it is evaluated whether further iterations should be performed. If so, the process returns to step 505 and initiates a new iteration. Otherwise, step 517 is followed by step 519 in which the image signal is generated by the image generator 205 and encoder 207 to comprise the set of included images.

As previously mentioned, in some embodiments, the iterations may be performed until the set of candidate images is empty, i.e. until all candidate images have been selected.

In other embodiments, the approach may proceed until the prediction errors for all remaining candidate images are below a given threshold. In this case, it may be considered that all views can be predicted sufficiently accurately, and no further image data is necessary. In such embodiments, the decision of whether to perform another iteration or not may be made after step 505 in which prediction quality measures are determined. The iterations may specifically be stopped if the lowest prediction quality measure is above a given threshold.

The selection of the candidate image(s) and the subset of pixels that are included in the partial image is performed by consideration of the relation to other, specifically already included, images and in response to a consideration of the prediction impact of the selections.

The approach has been found to tend to result in sets of included images that are highly suitable for encoding and transmission. The approach has been found to substantially reduce the data rate for a given desired image quality. At the same time, the iterative approach allows for a particularly efficient and low complexity implementation with a low computational requirement.

In some embodiments, the determination of the prediction quality measure in step 507 may as mentioned by done by selecting and counting the number of pixels for which the prediction error is below a given threshold.

Specifically, the iterator 405 may determine a plurality of pixels of a first candidate image for which pixel values for corresponding pixels of the first candidate image and the predicted image for the candidate image meet a similarity criterion. Thus, the pixels that are sufficiently well predicted may be determined and the prediction quality measure for the first candidate image may be determined in response to a property of the plurality of pixels, e.g. as a monotonically increasing function of the number of pixels in the plurality of pixels. Thus, the prediction quality measure may increase for an increasing number of pixels that have been sufficiently well predicted.

The approach is thus based on selecting a subset of pixels that meet a similarity criterion. In some embodiments, the subset of pixels that is determined in step 513 may be determined based on the subset that is determined in step 507.

Specifically, the subset of the pixels that are included in the partial image may be generated from the pixels of the candidate image that are not included in the plurality of pixels that meet the similarity requirement. Thus, the same consideration, criteria, and approach may be used for determining the prediction quality measure used to select the candidate image and for generating the subset/prune mask for this image. This may not only in many embodiments reduce complexity and computational resource usage as the same operation is used for both purposes, but may also in many embodiments provide an improved selection as the selection directly relates to the amount of image data that will be included in the image signal as a result of the selection.

For example, the image signal transmitter 200 may proceed to generate a prune mask for each of the candidate images thereby dividing the candidate image into a first subset of pixels for which the similarity criterion is met and a second subset for which the similarity criterion is not met. The number of pixels in the first subset may be determined and used as a prediction quality measure. Specifically, the candidate image having the lowest prediction quality measure, corresponding to the lowest number of pixels in the first subset and the highest number of pixels in the second subset. The partial image is then generated by only including the pixels of the second subset and discarding the pixels of the first subset, e.g. by setting the pixel values thereof to a fixed value (e.g. to 0).

In some embodiments, the image signal transmitter 200 may in step 511 select pixels for the partial image by considering the prediction improvement/error change (i.e. change in error between predicted pixel value and correct value) to the remaining candidate images that will result from including the individual pixel. Specifically, the image signal transmitter 200 may for a given first pixel in the selected image determine a prediction quality improvement for pixels of other candidate images by including the first pixel in the prediction process. The first pixel is then included in the generated partial image if this prediction quality improvement is above a threshold.

The prediction quality improvement may specifically be determined by the following process.

First predictions are generated for each remaining candidate image from the set of included images and the selected image, i.e. predictions are generated for the candidate image by further considering the image selected in step 509. Thus, in contrast to the prediction in step 505, step 513 generates a new prediction for each candidate image which is also based on the image selected in step 509. For example, for a first remaining candidate image, the iterator 405 generates a predicted image based on all the images in the set of included images from the previous iterations and the selected image from this iteration.

For the pixels of this first remaining candidate image, the iterator 405 then proceeds to determine an error change which is indicative of a change in the difference between the value of the pixel and the predicted value determined based on the set of included images plus the selected image relative to the predicted value determined based only on the set of included images.

Thus, for each pixel of the first remaining candidate image, a first prediction error may be determined for the prediction that includes the selected image and a second predication error may be determined for the predication that does not include the selected image, i.e. corresponding to the prediction that was previously made in step 505. The difference between these reflects the prediction improvement achieved by including the selected image in the prediction. For a Yuv color representation, the error change (by including the selected image) may for example for each pixel be determined as:

$$\text{SquaredError}_{cond} = (Y_{ref} - Y_{cond})^2 + (U_{ref} - U_{cond})^2 + (V_{ref} - V_{cond})^2 \qquad \text{i.}$$

$$\Delta \text{SqError} = \text{SquaredError}_{before} - \text{SquaredError}_{after} \qquad \text{ii.}$$

where index cond refers to the predicted image, index ref refers to the original candidate image, and index before and after refer to respectively the prediction error for a prediction not considering the selected image and a prediction considering the predicted image.

Thus, the error change is determined for each pixel of a first remaining candidate image. This may form a candidate error change image which is then view shifted from the view pose of the first remaining candidate image to the view pose of the selected image. As a result, a selected error change image is determined by a view pose shift from the view pose of the first remaining candidate image to the view pose of the selected image where the pixel values reflect the change in prediction error that occurs in the predicted candidate image by including that pixel of the selected image in the prediction of the first remaining candidate image. Thus, a direct measure of the benefit to the prediction of that first remaining candidate image by including the individual pixel in the partial image of the selected image is determined.

The iterator 405 may accordingly proceed to select all pixels for which the error change image indicates that the error will be reduced by more than a given threshold.

However, in many embodiments, the selection of pixels for the partial image is not just based on considering one remaining candidate image but on considering multiple and typically all of these. In many embodiments, error change images shifted to the view pose of the selected image may be generated for all of the remaining candidate images.

In some embodiments, these may then be considered separately, for example by including a pixel in the partial image if any of the generated error change images indicate that an improvement above a given threshold can be achieved. However, in many embodiments, a combined error change image may be generated by combining error change values determined for different candidate images for the same pixel of the selected image. As a simple example, the error change values for the different candidate images may simply be added together or averaged after having been shifted to the view pose of the selected image. The iterator 405 may then proceed to select the pixels of the selected image for which the combined error change values indicate an error reduction above a given threshold in the partial image, i.e. the pixels that provide the largest overall prediction improvement to the remaining candidate images are selected.

In many embodiments, the combined error change image may include an error change image generated for the selected image itself. Indeed, at this stage, the selected image is only predicted (not fully included), so the selected image may advantageously also be included when calculating in the combined error change image thereby indicating the prediction improvement that is achieved for the selected image itself. For example, it may be that a pixel is included in the partial image because it is needed for the selected image itself but not for any of the remaining candidate images.

As previously described, the prediction/view synthesis performed (specifically in step 505) may in many embodiments be performed by generating individual intermediate prediction images for a first candidate image for each of the images in the set of included images, i.e. one intermediate image may be generated for each candidate image and included image pair. These intermediate prediction images are then combined/blended into a single predicted image for the first candidate image.

In many embodiments, a synthesizer may be used which is arranged to perform all of these operations and which may simply as an input be provided with the set of included images (and the associated view poses) and the view pose for which the synthesized/predicted image is to be generated. It may from these inputs generate the synthesized/predicted image for the given candidate image. The synthesizer may be implemented as an integrated function and algorithm, such as a software subroutine, function, or object, that does not allow access to the intermediate results or operations. Thus, the generation of the intermediate images and the blending may not be accessible to other functions, processes or operations. In embodiments using such a synthesizer, the prediction in e.g. step 505 may accordingly require that in each iteration, a full synthesis is performed for all candidate images using all included images.

However, in some embodiments, a synthesizer may be used which allows access to the intermediate prediction images and the blending. This may for example be the case if a synthesis function is specifically developed for the purpose of implementing the method of FIG. 5.

In such an embodiment, the iterator 405 may be arranged to further store intermediate images that are generated in one iteration and to retrieve the intermediate images that have been stored in a subsequent iteration.

Thus, in such an embodiment, an intermediate prediction image may be provided for the blending by retrieving one that has been generated and stored in a previous iteration if one such image is available, and to generate a new intermediate prediction image by view shifting only if no such image is stored from a previous iteration. Thus, if an intermediate prediction image has previously been generated, this is reused, and no new view shift operation is required for that candidate and included image pair.

In the method of FIG. 5, new images are predicted for candidate images based on a set of included images which is gradually grown/expanded in each iteration. Thus, in each iteration, the generation of a new prediction for a given remaining candidate image is performed based on the same included images as in the previous iteration plus any images that were included by the previous iteration. Thus, for all images except those selected in the previous iteration, intermediate prediction images have already been generated and stored. Thus, new intermediate prediction images are only generated for the images that were included in the previous iteration, and in many embodiments, only one new intermediate prediction image need to be generated for each remaining candidate image (e.g. replacing the old intermediate prediction image as it is no longer needed).

Thus, the method is highly amenable to an incremental prediction approach and accordingly may be used to provide a very efficient implementation with a very significant reduction in the required processing.

It will be appreciated that different approaches for blending pixels of the intermediate prediction images may be used in different embodiments, and that specifically different functions and parameters may be used for generating the weights.

In many embodiments the blending may be a weighted combination where the weight for a given pixel is dependent on the depth associated with the pixel. For example, the blending may be a selection blending where the depth for all pixels in the intermediate prediction images for a given pixel position are compared and the pixel of the intermediate prediction image that has the furthest forward depth value is selected. In many embodiments, a more gradual weighting of the different pixels based on weight may be used. For example, an exponential relationship between depth and weight may often be used.

In other embodiments, other parameters may alternatively or additionally be considered. For example, it may be considered how much stretching (geometric distortion of the underlying primitives) is required to perform the view shift and the weight may be reduced the more stretching and geometric distortion of the primitives that is required. In many embodiments, only a single image is selected for inclusion in the set of included images in each iteration. However, in some embodiments, the subset of selected images may advantageously include a plurality of images in each iteration and thus a plurality of images may be moved to the set of included images in each iteration.

This may in some scenarios increase the data rate slightly but may in some embodiments substantially reduce the computational requirements and specifically the number of predictions that are necessary for the full method to be executed. It may in particular provide a substantially reduced computational resource usage in embodiments where the incremental prediction cannot be used, e.g. because there is no access to the intermediate prediction images or the blending operation.

In many embodiments, the selection of pixels for the partial image may include some processing of the initial subset that is e.g. determined based on pixel prediction properties. Such processing may specifically take into account spatial properties or relationships of the pixels.

As a specific example, the iterator 405 may generate a mask corresponding to the subset of pixels, e.g. a binary image may be generated which for each value indicates whether this is to be included in the partial image or not. As another example, an image reflecting the pixel prediction quality values may be generated (e.g. the combined error change image). Such an image may be a soft mask as it reflects the likelihood or benefit of including the value in the partial image, and thus together with a threshold represents the pixels that are included in the partial image.

Rather than directly use such a mask as originally generated, the iterator 405 may be arranged to first process the mask. Specifically, a spatial filter, and typically a spatial low pass filter may be applied to the mask. The change in the mask may accordingly result in a modification of the subset of pixels selected for the partial image.

Such filtering may be very useful for avoiding very thin structures in the partial image. An example of a spatial filter that may be applied is a box blur with a small kernel.

In some embodiments, the images that are processed may be frames of a video sequence. In such a case, the order of the set of included images determined for one frame may be applied in a plurality of frames. For example, for an intra encoded frame, the described approach may be used to generate a sequential set of included images. The same arrangement/order/sequence of images may then be used for all inter coded frames until the next intra-coded frame. Thus, in some embodiments, the method may only be executed for intra-frames and the arrangement determined in this operation may be reused for all subsequent intra-frames.

The pruning masks may be reused for some frames, for instance by generating the pruning masks at a lower frame rate, or by reusing pruning masks in cases when there is an indication of low image motion. Alternatively, the pruning masks may be generated for all inter-coded frames using the arrangement that has been determined for the intra-coded frame.

It may specifically be favorable to update the arrangement at a scene change, but such an event will typically also trigger an extra intra frame which may then cause a mew arrangement to be determined.

Such an approach may provide an improved consistency across frames. The overall data rate or quality degradation may be slightly higher than if the method was applied to each frame, but typically this will a desirable trade-off to achieve a more consistent visual result as temporal variations tend to be highly visible to a viewer.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention can in general be summarized as a method of generating an image signal, the method comprising:

receiving (501) a candidate set of images comprising a plurality of images of a scene, at least some images of the candidate set of images being for different view poses of the scene;

selecting (503) at least one image of the candidate set of images and initializing a set of included images to include the at least one image;

iteratively performing the steps of:

generating (505) predicted images for the images of the candidate set of images from the images of the set of included images;

determining (507) a prediction quality measure for each image of the set of candidate images, the prediction quality measure for a first image of the set of candidate images being indicative of a difference between the first image and a first predicted image for the first image;

selecting (509) a set of selected images from the set of candidate images in response to the prediction qualities;

for each image of the set of selected images determining (511) a subset of pixels in response to pixel prediction qualities for the pixels of the image;

generating (513) a set of partial images corresponding to the set of selected images, the partial image for a given image of the selected set of images comprising only the pixels of the subset of pixels for the given image;

including (515) the set of partial images in the set of included images; and removing (515) the set of selected images from the candidate set of images;

generating (519) the image signal comprising image data of the images in the set of included images.

This method can be further defined as defined in the appended claims 2-13.

The invention can in general further be summarized as a computer program product comprising computer program code means adapted to perform all the steps of any of above listed summarized methods of generating an image signal when said program is run on a computer.

The invention can in general even further be summarized as an apparatus for generating an image signal, the apparatus comprising:

a receiver (401) for receiving (501) a candidate set of images comprising a plurality of images of a scene, at least some images of the candidate set of images being for different view poses of the scene;
a reference selector (403) for selecting (503) at least one image of the candidate set of images and initializing a set of included images to include the at least one image;
an iterator (405) for iteratively performing the steps of:
generating (505) predicted images for the images of the candidate set of images from the images of the set of included images;
determining (507) a prediction quality measure for each image of the set of candidate images, the prediction quality measure for a first image of the set of candidate images being indicative of a difference between the first image and a first predicted image for the first image;
selecting (509) a set of selected images from the set of candidate images in response to the prediction qualities;
for each image of the set of selected images determining (511) a subset of pixels in response to pixel prediction qualities for the pixels of the image;
generating (513) a set of partial images corresponding to the set of selected images, the partial image for a given image of the selected set of images comprising only the pixels of the subset of pixels for the given image;
including (515) the set of partial images in the set of included images; and
removing (515) the set of selected images from the candidate set of images;
an output circuit (205, 207) for generating (519) the image signal comprising image data of the images in the set of included images.

The invention can be specifically summarized as defined in the appended claims 1-15.

The invention claimed is:
1. A method of generating an image signal, the method comprising:
receiving a candidate set of images,
wherein the candidate set of images comprise a plurality of images of a scene,
wherein at least some images of the candidate set of images are for different view poses of the scene;
selecting at least one image from the candidate set of images;
initializing a set of included images to comprise the at least one image;
generating predicted an image for each image of the images of the candidate set of images from at least one of the images of the set of included images;
determining a prediction quality measure for each image of the set of candidate images, wherein the prediction quality measure for a first image of the set of candidate images are indicative of a difference between the first image and a first predicted image for the first image;
selecting a set of selected images from the set of candidate images in response to the prediction quality measure, wherein each of the selected images have the lowest prediction quality measure with respect to the images already included in the set of selected images;
determining a subset of pixels in response to pixel prediction qualities for the pixels of the image for each image of the set of selected images;
generating a set of partial images corresponding to each image of the set of selected images, wherein the partial image for a given image of the selected set of images comprises only the pixels of the subset of pixels for the given image;
including the set of partial images in the set of included images;
removing the set of selected images from the candidate set of images; and
generating the image signal, wherein the image signal comprises image data of the images in the set of included images.

2. The method of claim 1, wherein the determining of the prediction quality comprises:
determining a plurality of pixels of the first image for which pixel values for corresponding pixels of the first image and the first predicted image meet a similarity criterion;
determining the prediction quality for the first image in response to a property of the plurality of pixels.

3. The method of claim 2,
wherein the property is a number of pixels,
wherein the prediction quality is a monotonically increasing function of the number of pixels in the plurality of pixels.

4. The method of claim 3, wherein determining the subset of pixels comprises determining a subset of pixels for the first image from pixels of the first image not included in the plurality of pixels for the image.

5. The method of claim 1, wherein determining the subset of pixels for a first selected image of the set of selected images comprises:
determining an error change for pixels of the at least one candidate image,
wherein the error change is indicative of a change in difference between a pixel of the at least one candidate image and a predicted pixel,
wherein the predicted pixel is based on the set of included images and the first selected image relative to a prediction of the pixel of the least one candidate image based only on the set of included images;
generating an error change image for the first selected image, wherein the error change image comprises pixel values determined from error changes of the at least one candidate image by a view pose shift from a view pose of the at least one candidate image to a view pose of the first selected image; and
selecting the subset of pixels in response to the error change image.

6. The method of claim 5, wherein determining the subset of pixels for the first selected image comprises:
determining error changes for a plurality of candidate images of the set of candidate images; and
generating the error change image by combining error change values determined from different candidate images for the same pixel of the first selected image.

7. The method of claim 1, wherein generating predicted images for the candidate set of images comprises:
providing intermediate prediction images of the first candidate image for each of the image of the set of included images for a first candidate image of the set of candidate images; and
generating the first predicted image by combining the intermediate prediction images.

8. The method of claim 7, wherein the iteration further comprises storing intermediate prediction images,
wherein providing intermediate prediction images comprises:
retrieving stored intermediate prediction images for images of the set of included images for which intermediate prediction images have been generated and stored in a previous iteration; and predicting intermediate prediction images for any image of the set of reference images for which no intermediate prediction image has been stored in a previous iteration.

9. The method of claim 7,
wherein the combination is a weighted combination,
wherein a weight for a pixel is dependent on a depth of the pixel.

10. The method of claim 1, wherein the iterations are stopped when a lowest prediction quality exceeds a threshold.

11. The method of claim 1, wherein the subset of selected images comprises a plurality of selected images.

12. The method of claim 1,
wherein the images are frames of a video sequence, and
wherein the method comprises using an arrangement of the set of included images for a plurality of frames.

13. The method of claim 1, further comprising:
generating a mask corresponding to the subset of pixels; and
modifying subset of pixels in response to an application of a spatial filter to the mask.

14. An apparatus for generating an image signal, the apparatus comprising:
a receiver circuit,
wherein the receiver circuit is arranged to receive a candidate set of images,
wherein the candidate set of images comprise plurality of images of a scene,
wherein at least some images of the candidate set of images are for different view poses of the scene;
a reference selector circuit,
wherein the reference selector circuit is arranged to select at least one image from the candidate set of images,
wherein the reference selector circuit is arranged to initialize a set of included images to comprise the at least one image;
an output circuit,
wherein the output circuit is arranged to generate the image signal, wherein the image signal comprises image data from the set of included images; and
an iterator circuit,
wherein the iterator circuit is arranged to generate at least one predicted image(s) for each image of the images of the candidate set of images at least one of from the images of the set of included images;
wherein the iterator circuit is arranged to generate at least one determining a prediction quality measure for each image of the set of candidate images, the prediction quality measure for a first image of the set of candidate images are indicative of a difference between the first image and a first predicted image for the first image;
wherein the iterator circuit is arranged to select a set of selected images from the set of candidate images in response to the prediction quality measure, wherein each of the selected images have the lowest prediction quality measure with respect to the images already included in the set of selected images;
wherein the iterator circuit is arranged to determine a subset of pixels in response to pixel prediction qualities for the pixels of the image for each image of the set of selected images;
wherein the iterator circuit is arranged to generate a set of partial images corresponding to each image of the set of selected images, wherein the partial image for a given image of the selected set of images comprises only the pixels of the subset of pixels for the given image;
wherein the iterator circuit is arranged to include the set of partial images in the set of included images; and
wherein the iterator circuit is arranged to remove the set of selected images from the candidate set of images.

15. A computer program stored on a non-transitory medium, wherein the computer program when executed on a processor performs the method as claimed in claim 1.

16. The apparatus of claim 14, wherein the determining of the prediction quality comprises:
determining a plurality of pixels of the first image for which pixel values for corresponding pixels of the first image and the first predicted image meet a similarity criterion;
determining the prediction quality for the first image in response to a property of the plurality of pixels.

17. The apparatus of claim 16,
wherein the property is a number of pixels,
wherein the prediction quality is a monotonically increasing function of the number of pixels in the plurality of pixels.

18. The apparatus of claim 17, wherein determining the subset of pixels comprises determining a subset of pixels for the first image from pixels of the first image not included in the plurality of pixels for the image.

19. The apparatus of claim 14, wherein determining the subset of pixels for a first selected image of the set of selected images comprises:
determining an error change for pixels of the at least one candidate image,
wherein the error change is indicative of a change in difference between a pixel of the at least one candidate image and a predicted pixel,
wherein the predicted pixel is based on the set of included images and the first selected image relative to a prediction of the pixel of the least one candidate image based only on the set of included images;
generating an error change image for the first selected image, wherein the error change image comprises pixel values determined from error changes of the at least one candidate image by a view pose shift from a view pose of the at least one candidate image to a view pose of the first selected image; and
selecting the subset of pixels in response to the error change image.

20. The apparatus of claim 19, wherein determining the subset of pixels for the first selected image comprises:
determining error changes for a plurality of candidate images of the set of candidate images; and
generating the error change image by combining error change values determined from different candidate images for the same pixel of the first selected image.

* * * * *